US008701375B2

(12) United States Patent
Neubauer

(10) Patent No.: US 8,701,375 B2
(45) Date of Patent: Apr. 22, 2014

(54) CONTAINER TREATMENT PLANT AND METHOD OF TREATING CONTAINERS

(75) Inventor: Michael Neubauer, Regensburg (DE)

(73) Assignee: Krones AG, Neutraubling (DE)

( * ) Notice: Subject to any disclaimer, the term of this patent is extended or adjusted under 35 U.S.C. 154(b) by 345 days.

(21) Appl. No.: 13/118,716

(22) Filed: May 31, 2011

(65) Prior Publication Data

US 2011/0289883 A1 Dec. 1, 2011

(30) Foreign Application Priority Data

May 31, 2010 (DE) ........................ 10 2010 029 520

(51) Int. Cl.

| | |
|---|---|
| ***B65B 65/08*** | (2006.01) |
| ***B29C 49/00*** | (2006.01) |
| ***B65B 55/02*** | (2006.01) |
| ***B67C 7/00*** | (2006.01) |

(52) U.S. Cl.

CPC ............... *B65B 55/02* (2013.01); *B67C 7/0013* (2013.01)

USPC .................... 53/426; 53/167; 53/235; 53/285

(58) Field of Classification Search

CPC .... B65B 55/10; B65B 55/103; B65B 55/022; B65B 55/06; B65B 55/02; B65B 55/027; B65B 3/003; B67C 7/0013; B67C 7/0073; B67C 7/0006; B67C 7/0026; B67C 7/0033; B67C 7/004

USPC ........ 53/111 R, 425, 426, 510, 167, 235, 285

See application file for complete search history.

(56) References Cited

U.S. PATENT DOCUMENTS

| | | | | |
|---|---|---|---|---|
| 3,104,752 | A * | 9/1963 | Rudszinat et al. | 198/481.1 |
| 3,164,243 | A * | 1/1965 | Schubert et al. | 198/450 |
| 3,228,512 | A * | 1/1966 | Schubert et al. | 198/457.02 |
| 4,511,027 | A | 4/1985 | Zamboni | |
| 4,697,691 | A * | 10/1987 | Zodrow et al. | 198/426 |

(Continued)

FOREIGN PATENT DOCUMENTS

| | | |
|---|---|---|
| CN | 1054946 A | 10/1991 |
| CN | 1355761 A | 6/2002 |

(Continued)

OTHER PUBLICATIONS

Search Report for EP 11161735 mailed Sep. 26, 2011.

(Continued)

*Primary Examiner* — Hemant M Desai

(74) *Attorney, Agent, or Firm* — Marshall, Gerstein & Borun LLP

(57) ABSTRACT

A container treatment plant, with a discontinuously working container treatment machine and having a feed conveyor and/or a discharge conveyor each for individual containers, and in the feed conveyor and/or the discharge conveyor, at least two continuously driven, circulating conveyor means supplying each other with individual containers, and where the conveyor means being closer to the discontinuously working container treatment machine in the conveying direction exhibits a closer conveying pitch than the conveying pitch of the conveyor means which is further away. In this manner, a container acceptance and/or transfer interruption caused by the respective cycle standstill of the discontinuously working container treatment machine is compensated by the conveying pitch difference to be able to continuously supply individual containers for the discontinuously working machine or continuously discharge them from the discontinuously working container treatment machine.

12 Claims, 1 Drawing Sheet

(56) References Cited

U.S. PATENT DOCUMENTS

| | | | | |
|---|---|---|---|---|
| 6,419,076 | B1 * | 7/2002 | Tsutsui | 198/465.2 |
| 6,499,280 | B1 * | 12/2002 | Tsutsui | 53/570 |
| 6,976,836 | B2 * | 12/2005 | Suzuki | 425/526 |
| 2011/0056172 | A1 * | 3/2011 | Klenk et al. | 53/268 |

FOREIGN PATENT DOCUMENTS

| | | | |
|---|---|---|---|
| CN | 1914103 | A | 2/2007 |
| CN | 101218159 | A | 7/2008 |
| CN | 101432209 | A | 5/2009 |
| DE | 3504555 | A1 | 10/1986 |
| DE | 19737697 | A1 | 3/1999 |
| DE | 19819731 | A1 | 11/1999 |
| DE | 10325693 | A1 | 7/2004 |
| DE | 102004053663 | A1 | 8/2005 |
| DE | 60018456 | T2 | 2/2006 |
| DE | 102007017938 | A1 | 10/2008 |
| DE | 102008038143 | A1 | 2/2010 |
| EP | 1295820 | A1 | 3/2003 |
| WO | WO-9821019 | A1 | 5/1998 |
| WO | WO-2006097796 | A2 | 9/2006 |
| WO | WO-2010020530 | A1 | 2/2010 |

OTHER PUBLICATIONS

Notification of the First Office Action, State Intellectual Property Office of the People's Republic of China, Application No. 201110155088.0, dated Jun. 26, 2013.

* cited by examiner

CONTAINER TREATMENT PLANT AND METHOD OF TREATING CONTAINERS

CROSS-REFERENCE TO RELATED APPLICATION

The present application claims the benefit of priority of German Application No. 102010029520.5, filed May 31, 2011. The entire text of the priority application is incorporated herein by reference in its entirety.

FIELD OF THE DISCLOSURE

The disclosure relates to a container treatment plant and to a method of treating containers, such as used in beverage bottling operations.

BACKGROUND

In the beverage bottling industry, mainly two types of container treatment machines are employed, namely continuously working container treatment machines, e.g. rotary machines, and discontinuously working container treatment machines. Both types of machines have advantages and disadvantages. The greatest advantage of discontinuously working container treatment machines is that the container treatment elements which sometimes have to be supplied with working media, e.g. filling valves, are located stationarily at one place and do not have to be moved during the container treatment. The fact that, for example, rotary transmission leadthroughs are completely eliminated in discontinuously working container treatment machines, results in a considerable cost advantage and increased process security. However, the supply and/or discharge of the containers must be also timed, which is not only complicated but aggravates an optionally desired connection of the discontinuously working machine and at least one continuously working machine in a block. In continuously working rotary machines, all treatment elements are often arranged on a rotating carousel, which, however, requires complex and expensive rotary transmission leadthroughs for medium supply, e.g. with energy, filling medium, beverage compressed air and the like, however permits a continuous supply and discharge of the containers. For these reasons, there is a considerable demand for a simple connection of discontinuously working container treatment machines and continuously working container treatment machines in a block in a container treatment plant. Continuously working container treatment machines can here also be transport devices, such as feed and discharge conveyors.

In container treatment plants, e.g. consisting of a blow molding machine that continuously supplies containers and e.g. a filling machine connected with it in a block and discontinuously treating groups of containers, as well as corresponding conveyor means, the continuous throughput of the continuously working container treatment machine, e.g. the blow molding machine, optionally dictates the total throughput of the container treatment plant. During each cycle standstill of the discontinuously working container treatment machine, however, one container is accepted or discharged. This interruption caused by the cycle standstill must be compensated in view of the desired continuous total throughput. Accordingly, the feed and the discharge conveyor would have to work in a cyclic operation such that they can compensate the throughput loss of containers caused by the cycle. For this, e.g. a complicated buffer storage would be required, and/or, as a result of the interlinkage between a continuously working container treatment machine and a discontinuously working container treatment machine, the feed and discharge conveyors each would have to temporarily process an essentially higher throughput than the total throughput.

From DE 197 37 697 A, a container treatment plant is known in which a discontinuously working preform injection molding machine is linked with a continuously working blow molding machine via a continuously driven discharge conveyor. The discharge conveyor is embodied as a transfer starwheel to which two rotatably drivable injection molding rotors are associated in the preform injection molding machine, where one of them each produces a group of preforms as treatment station and is standing still in the process and disconnected from the discharge conveyor, while the other one is driven in synchronism and coupled with the discharge conveyor, then works as conveyor means and supplies preforms to the discharge conveyor individually. This principle is complicated both with respect to its construction and control because main components of the discontinuously working container treatment machine are required twice and must be controlled individually. Moreover, structurally complex and fault liable rotary transmission leadthroughs for the plastic mass are required in the injection molding rotors.

From DE 10 2004 053 663 A, a container treatment plant with several machines linked via conveyor means is known, of which in case of a malfunction, for example a labeling machine temporarily works more slowly than a continuously working blow molding machine linked to it, or even has to be temporarily stopped. Between two linked machines each, dynamic buffer storages are incorporated in conveyor means which intermediately store, deliver or deliver subsequently corresponding to throughput differences between the machines. This concept is technically complex, causes long dwelling times of the containers in the respective buffer storage, and only permits a linkage of two machines each.

SUMMARY OF THE DISCLOSURE

One aspect of the present disclosure is to provide a container treatment plant as well as a method of treating containers in the container treatment plant by means of which containers can be continuously fed and/or discharged despite the cycle standstills of the discontinuously working container treatment machine, or the discontinuously working container treatment machine can be linked with at least one continuously working container treatment machine in a structurally simple manner.

In the present container treatment plant, the discharge and/or transfer interruption caused by each cycle standstill of the discontinuously working container treatment machine is compensated just by a difference in the conveying pitch between continuously circulating conveyor means in a structurally simple manner, where the conveyor means run continuously, so that the containers are continuously fed and/or discharged despite the cycle standstills. The advantage of a continuous feed and/or discharge of the containers furthermore provides a structurally simple possibility of linking the at least one discontinuously working container treatment machine with at least one continuously working container treatment machine. By the coordination between the different conveying pitches and the circulation speeds of the conveyor means to the cycle standstills of the discontinuously working container treatment machine, a time buffer is generated in each case which at least largely corresponds to the period of the cycle standstill. This principle is suitably used for the feed and discharge or only for the feed or only for the discharge of the containers. The at least one discontinuously working container treatment machine can optimally show its functional benefits to advantage in the plant.

According to the disclosed method, intentional conveying pitch differences are set between at least two continuously driven, circulating conveyor means which supply each other to create time buffers in each case despite a continuous feed and/or discharge of separated containers which at most correspond to the cycle standstills of the discontinuously working container treatment machine, which thus does not require e.g. any complex rotary transmission leadthroughs for working media and is subjected to less inertia forces.

In one suitable embodiment of the container treatment plant, in case of two continuously driven, circulating conveyor means, the conveying pitch of the conveyor means being closer to the discontinuously working container treatment machine amounts to half the conveying pitch of the conveyor means which is further away, so that the closer conveyor means is filled during approximately two circulations, and the conveyor means which is further away only supplies approximately half a complete filling during each circulation. Particularly suitably, the conveyor means being closer to the discontinuously working container treatment machine has an uneven number of conveying pitches, while the conveyor means which is further away has an even number of conveying pitches. This can harmonize the treatment process.

Suitably, the container pitch provided in the discontinuously working container treatment machine is in accordance with the conveying pitch of the closer conveyor means, i.e. only the conveyor means which initially accept the containers and discharge them at the end have the wider conveying pitches which can be suitably identical to each other.

In one suitable embodiment, an intermediate conveyor means that can be driven in time with the discontinuously working container treatment machine is furthermore provided between the discontinuously working container treatment machine and the respective closer conveyor means, where the conveying pitch of the intermediate conveyor means is in accordance with the conveying pitch of the closer conveyor means and the container pitch in the discontinuously working container treatment machine. The respective intermediate conveyor means facilitates the supply or discharge of the containers into or out of the discontinuously working container treatment machine. As an alternative, however, the closer conveyor means can also directly supply or empty the discontinuously working container treatment machine, i.e without any intermediate conveyor means. In a further alternative, an intermediate conveyor means could also be provided only at the intake side or at the output side of the discontinuously working container treatment machine.

Suitably, the at least two continuously driven conveyor means in the feed and/or discharge conveyor are rotationally driven conveyor starwheels with container transport elements essentially at the circumference. Such conveyor starwheels are structurally simple, functionally reliable and inexpensive. Here, the radian measure distance between the container transport elements of the conveyor starwheel which is further away should be twice the radian measure distance between the container transport elements of the closer conveyor starwheel to completely fill or empty the closer conveyor starwheel during approximately two circulations.

Suitably, a treatment starwheel with container transport elements is provided in the discontinuously working container treatment machine. This treatment starwheel is only rotationally driven for filling or emptying, respectively, but is stopped during the cycle standstill and optionally disconnected from the feed and/or discharge conveyor.

If at least one intermediate conveyor means is provided, it could be a structurally simple and functionally reliable transfer starwheel with container transport elements. The employed starwheels could furthermore be embodied as reduction starwheels.

Suitably, the container transport elements are controlled or non-controlled container acceptance and/or transfer means, such as e.g. clamp grippers or the like, e.g. for neck handling or base handling the containers.

In one suitable embodiment, the provided starwheels have identical working diameters.

In one alternative embodiment, each of the starwheels located further away from the discontinuously working container treatment machine has a working diameter different to that of the further starwheels which have identical working diameters. The working diameters of the starwheels which are further away could be identical.

In another preferred embodiment of the container treatment plant, at least one conveyor means which is further away and associated to the discontinuously working container treatment machine in the feed and/or discharge conveyor is a discharge or feed device of a continuously working container treatment machine, or a continuously working container treatment machine itself, preferably a rotary machine. The continuously working container treatment machine is connected in a block with the discontinuously working container treatment machine via the feed and/or discharge conveyor and can supply continuously or is supplied continuously.

In one suitable embodiment, the discontinuously working container treatment machine is a filler or a sterilizer.

In another embodiment, the continuously working container treatment machine is a rotary stretch-blow molding machine or a closer or a labeling machine.

In one method variant, in the feed conveyor, the conveying pitch of the conveyor means closer to the discontinuously working container treatment machine in the conveying direction is set exactly to half the conveying pitch of the conveyor means which is further away, the conveyor means which is further away fills the closer conveyor means during at least approximately two circulations of both conveyor means, the filling of the closer conveyor means is supplied into the discontinuously working container treatment machine in a further circulation of both conveyor means directly or indirectly, and the respective circulation of the two conveyor means is adapted in time to the cycle standstill of the discontinuously working container treatment machine, for example with respect to speed as well as to the difference in the conveying pitch. Thus, despite the continuous feed, a time buffer is generated from the difference in the conveying pitch which can correspond to the cycle standstill of the discontinuously working container treatment machine, or is optionally even somewhat shorter.

In a further alternative of the method, in the discharge conveyor, the conveying pitch of the conveyor means being closer to the discontinuously working container treatment machine is set to half the conveying pitch of the conveyor means which is further away, the closer conveyor means is filled from the discontinuously working container treatment machine in one circulation of the two conveyor means directly or indirectly, the conveyor means which is further away empties the closer conveyor means via at least approximately two circulations of both conveyor means, and the respective circulation of the two conveyor means is adapted in time to the cycle standstill of the discontinuously working container treatment machine, for example with respect to the circulation speed and/or the difference in the conveying pitch. Here, at least one timed intermediate conveyor means can withdraw the containers from the feed conveyor and/or from the discontinuously working container treatment machine and transport them further.

In a particularly suitable method variant, the conveyor means being closer to the discontinuously working container treatment machine and embodied with an uneven number of conveying pitches is filled or emptied by the conveyor means which is further away and embodied with an even number of conveying pitches.

BRIEF DESCRIPTION OF THE DRAWINGS

The subject matter of the disclosure will be illustrated with reference to the drawings. In the drawings.

A DETAILED DESCRIPTION OF THE PREFERRED EMBODIMENT

A container treatment plant B illustrated in FIGS. 1 to 6, for example in the beverage bottling industry, is depicted in a merely schematic representation which does not necessarily correspond to the actual arrangement of the individual components in practice, but shall only illustrate the basic principle of the operation of the container treatment plant. The individual components are shown in the figures in a linear arrangement, although in practice they can be functionally linked in arbitrary geometric configurations deviating from a linear arrangement.

A feed conveyor Z for the separated containers 3 and, at least in the embodiment shown, a discharge conveyor A are functionally associated to a discontinuously working container treatment machine MT, for example a filler or a sterilizer, which performs at least one container treatment at a batch of containers 3 while it is standing still (cycle standstill). The discontinuously working container treatment machine MT is represented with one single treatment station. As an alternative, the discontinuously working container treatment machine MT could comprise several stations (not shown) in which different treatments are performed at the containers 3 which are then standing still during a cycle standstill, where each container batch is transported through all stations after it has been accepted from the feed conveyor Z and/or before it is transferred to the discharge conveyor A.

Figure 1:
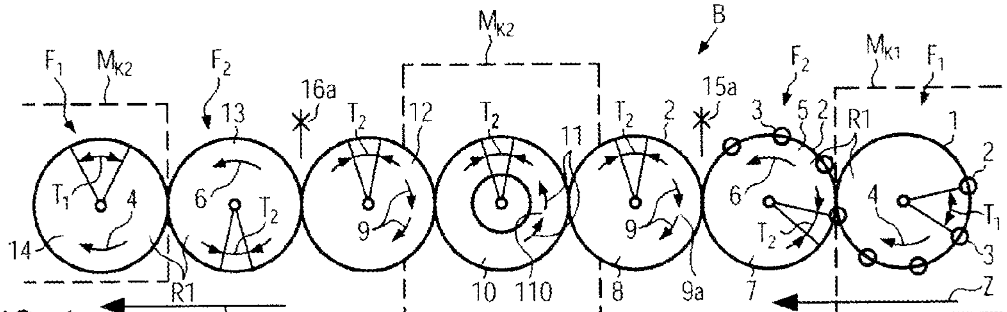
FIG. 1 shows in a schematic representation a container treatment plant with at least one discontinuously working container treatment machine in an initial filling phase.

In the embodiment of the container treatment plant indicated in FIG. 1, the feed conveyor Z and/or the discharge conveyor A comprises at least two conveyor means F1, F2; F1', F2' rotationally driven continuously and at the same circumferential speeds of container transport elements 2 arranged at the circumference. The two conveyor means F1, F2, F1', F2' are, for example, conveyor starwheels 1, 7; 13, 14 having the same or different working diameters. The container transport elements 2 can comprise controlled or non-controlled means to convey, optionally grip and transfer each container 3 individually. Between the conveyor starwheel 7 of the conveyor means F2 (13, F2') being closer to the discontinuously working container treatment machine MT and a discontinuously (arrows 11) rotationally drivable treatment starwheel 10 which can be stopped during a cycle standstill 11*a* (between arrows 11) in or at the discontinuously working container treatment machines MT, in FIG. 1 one intermediate conveyor means each is provided, for example in the form of a discontinuously rotationally drivable transfer starwheel 8, 12 synchronized with the treatment starwheel 10, which is also equipped with container transport elements 2.

The working diameters of the starwheels 7, 8, 10, 12 and 13 can be identical, while the working diameters of the starwheels 1 and 14 can differ from those of the starwheels 7, 8, 10, 12, 13 or be identical.

In each starwheel, the container transport elements 2 are arranged at the circumference with a certain conveying pitch, so that each starwheel exhibits a certain conveying pitch number of transport elements 2.

As an alternative, only the feed conveyor Z or only the discharge conveyor A could be provided and continuously feed or discharge containers.

The starwheels 7, 8, 10, 12 and 13 have identical closer conveying pitches T2, while the starwheels 1, 14 have identical, but wider conveying pitches T1 of their transport elements 2. The closer conveying pitch T2 corresponds to half the wider conveying pitch T2, i.e. with the same working diameters of the starwheels, the radian measure distance between two subsequent container transport elements 2 in the starwheels 1, 14 is exactly twice the radian measure distance between two subsequent container transport elements 2 in the starwheels 7, 8, 10, 12 and 13. Suitably, the conveying pitch number, i.e. the number of the container transport elements 2, in the starwheels 1, 14 is an even number, while the conveying pitch number in the starwheels 7, 8, 10, 12 and 13, i.e. the number of the container transport elements 2, is an uneven number.

The conveyor means F1, F2; F1', F2' are driven continuously (arrows 4, 6) and so as to circulate, while the starwheels 8, 10, 12 are standing still during each cycle standstill 11*a*, 9*a* and are rotationally driven before and after each cycle standstill (arrows 11, 9).

Furthermore, in the figures, 15*a*, 16*a* and 15*b*, 16*b*, respectively, indicate engaging and disengaging clutches which are provided, for example, to stop the starwheels 8, 10 and 12 during a cycle standstill (15*a*, 16*a*), while the starwheels 1, 7; 13, 14 are still rotating, but to rotationally drive the starwheels 8, 10, 12 (15*b*, FIG. 3) in synchronism with the starwheels 1, 7; 13, 14 after a cycle standstill.

In FIG. 1, the feed and/or discharge conveyors Z, A are continuously working container treatment machines, i.e. wherein the treatment is a continuous supply. It is furthermore indicated in a dashed line in FIG. 1 that at least the conveyor starwheel 1 (and optionally also the conveyor starwheel 14) can be a discharge conveyor or a feed conveyor of a continuously working container treatment machine MK1, MK2, or the continuously working container treatment machine MK1, MK2 itself, for example to link at least one continuously working container treatment machine MK1 and/or MK2 with the at least one discontinuously working container treatment machine MT in the container treatment plant B, or to connect them in a block. As mentioned, the intermediate conveyor means in the form of the transfer starwheels 8, 12, or at least one of them, could be omitted.

In the working phase in FIG. 1, the starwheels 8, 10, 12 of the still empty discontinuously working container treatment machine MT are standing still (cycle standstill). The starwheels 1, 7; 13, 14 run continuously. The conveyor starwheel 1 or the conveyor means F1 which is the one that is further away from the discontinuously working container treatment machine MT, fills, during one circulation, half of the conveyor starwheel 7 with the closer (half) conveying pitch T2 forming the second conveyor means F2 when both starwheels 1, 7 circulate together thanks to the wider conveying pitch T1.

Figure 2:
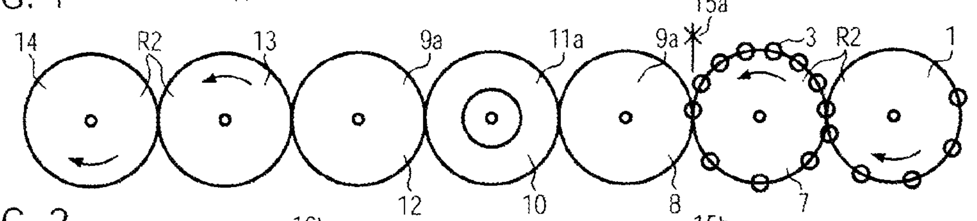
FIG. 2 shows the container treatment plant in a later working phase.

In FIG. 2, the two starwheels 1, 7 have performed nearly two circulations, so that the conveyor starwheel 7 is nearly completely filled with containers 3. The starwheels 8, 10 and 12 are still standing, as before.

Figure 3:
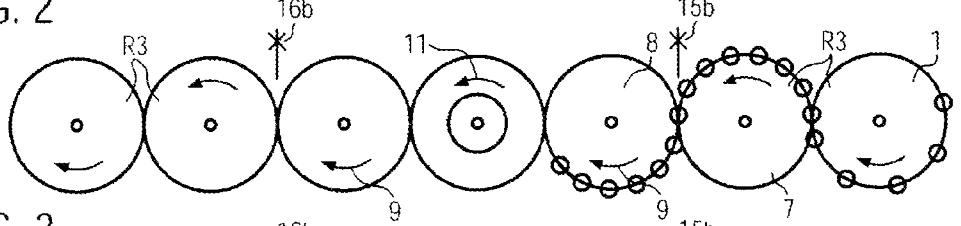
FIG. 3 shows the container treatment plant in an even later working phase.

In FIG. 3, the clutches 15*b*, 16*b* are shifted, so that the starwheels 8, 10 and 12 are also rotationally driven. The transfer starwheel 8 withdraws the complete number of containers 3 from the conveyor starwheel 7, while the conveyor starwheel 1 still supplies one container each to every second container transport element 2 of the conveyor starwheel 7.

Figure 4:
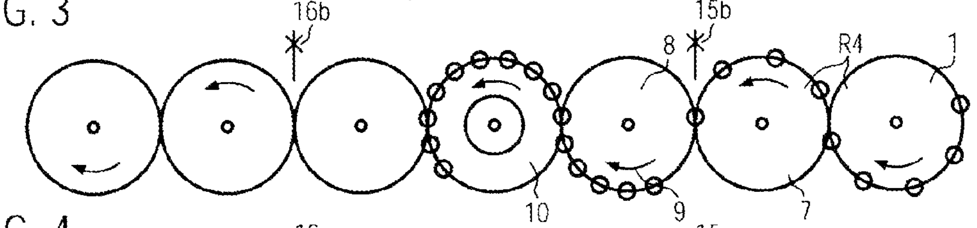
FIG. 4 shows the container treatment plant in an even later working phase.

In FIG. 4, the treatment starwheel 10 is filled by the transfer starwheel 8, while in the conveyor starwheel 7, only every second container transport element 2 obtains a container.

Figure 5:
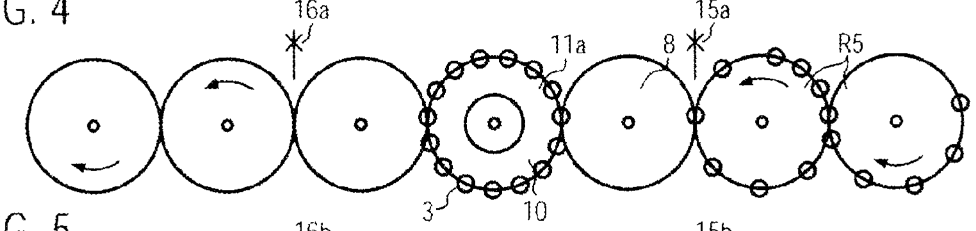
FIG. 5 shows the container treatment plant in a working phase during a cycle standstill of the discontinuously working container treatment machine.

In FIG. 5, the treatment starwheel 10 is completely filled with containers 3. Now, the clutches 15*a*, 16*a* are shifted again. The starwheels 8, 10 and 12 are standing still, while the starwheels 1, 7; 13, 14 are still running continuously. During this cycle standstill 11*a* of the starwheels 8, 10 and 12, the conveyor starwheel 1 fills the conveyor starwheel 7 again completely during a second circulation.

Figure 6:
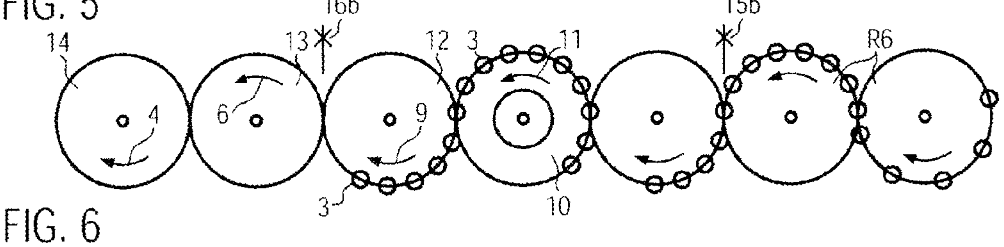
FIG. 6 shows the container treatment plant in a later working phase during the emptying process of the discontinuously working container treatment plant.

In FIG. 6, the treatment is completed and the clutches 15*b*, 16*b* are again shifted, so that the starwheels 8, 10, 12 rotate and the transfer starwheel 12 completely removes the containers from the treatment starwheel 10, while the transfer starwheel 8 is already on the point of emptying the filled conveyor starwheel 7. The transfer starwheel 12 then delivers (not shown) the withdrawn containers 3 to the conveyor starwheel 13 until it is completely filled, while the conveyor starwheel 14 only accepts every second container 3 from the conveyor starwheel 13 and continuously discharges the individual containers, or they are treated in the continuously working container treatment machine MK2 (FIG. 1) in the passage (rotary machine). The starwheels 8, 10 and 12 are rotationally driven until on the one hand the transfer starwheel 12 is completely emptied, and on the other hand the treatment starwheel 10 is again completely filled. The filling of the conveyor starwheel 13 is discharged by approximately two circulations of the starwheels 13, 14 by the conveyor starwheel 14.

The continuously working container treatment machines MK1 and/or MK2 are, for example, a stretch-blow molding machine or a closer or a labeling machine.

As mentioned, it can be suitable in practice with respect to a better utilization of the space for the container treatment plant B to select other angular positions between the starwheels than those shown, deviating from a linear orientation of the individual components.

The container treatment plant B is preferably suitable for container treatment machines of a smaller performance range as braking and accelerating the timed starwheels 8, 10, 12 require a certain time, limiting the maximum possible rate of conveyance. If, for example, the discontinuously working container treatment machine MT is a stationary filler which cooperates with a continuously working closer (MK2), the filler would not need any rotary mounting, no rotary transmission leadthroughs, and no surge chamber, not even under aseptic working conditions. The discontinuously working container treatment machine could also be a sterilizer, for example of an e-beam type with e-beam emitters as treatment fingers which submerge into the containers 3. The treatment fingers could be rigidly mounted, making a rotary mounting dispensable and facilitating the shielding of occurring X-rays as no rotating carousel is required in the treatment region.

The invention claimed is:

1. Container treatment plant (B), comprising at least one discontinuously working container treatment machine (MT) working discontinuously with interrupting cycle standstills, at least one feed conveyor (Z) and/or at least one discharge conveyor (A), each for individual containers, in functional association to the discontinuously working container treatment machine (MT), and in the feed conveyor (Z) and/or in the discharge conveyor (A), each at least two continuously driven, circulating conveyor means (F1, F2, F1', F2') supplying each other with individual containers are provided, one of the circulating conveyor means (F2, F2') of the at least two circulating conveyor means being located closer in the conveying direction to the discontinuously working container treatment machine (MT) than another of the at least two continuously driven, circulating conveyor means having a shorter conveying pitch (T2) than a wider conveying pitch (T1) than the other circulating conveyor means (F1, F1') located further away from the discontinuously working container treatment machine (MT), the shorter and wider conveying pitches defining a conveying pitch difference (T1−T2) of the circulating conveyor means (F1, F2, F1', F2') supplying each other individually with containers, wherein a container acceptance or transfer interruption caused by a respective cycle standstill of the discontinuously working container treatment machine is compensated for by the conveying pitch difference.

2. Container treatment plant according to claim 1, wherein among the at least two continuously driven, circulating conveyor means (F1, F2; F1', F2'), the shorter conveying pitch (T2) of the conveyor means (F2, F2') located closer to the discontinuously working container treatment machine (MT) amounts to half the wider conveying pitch (T1) of the conveyor means (F1, F1') located further away from the discontinuously working container treatment machine (MT).

3. Container treatment plant according to claim 1, wherein a container pitch (T2) is provided in the discontinuously working container treatment machine (MT) the container pitch corresponding to the shorter conveying pitch (T2) of the circulating conveyor means (F2, F2') located closer to the discontinuously working container treatment machine (MT).

4. Container treatment plant according to claim 3, wherein an intermediate conveyor means driven discontinuously in time with the discontinuously working container treatment machine (MT) is provided between the discontinuously working container treatment machine (MT) and the circulating conveyor means being located closer to the discontinuously working container treatment machine, the intermediate conveyor means conveying pitch corresponding to both the shorter conveying pitch (T2) of the conveyor means (F2, F2') located closer to the discontinuously working container treatment machine (MT) and the container pitch in the discontinuously working container treatment machine.

5. Container treatment plant according to claim 4, wherein the discontinuously driven intermediate conveyor means (8, 12) comprises a transfer starwheel having container transport elements (2).

6. Container treatment plant according to claim 3, wherein in the discontinuously working container treatment machine (MT), a treatment starwheel with container transport elements is provided.

7. Container treatment plant according to claim 1, wherein the at least two continuously driven, circulating conveyor means (F1, F2, F1', F2') in the feed conveyor (Z) and/or discharge conveyor (A) respectively comprise rotationally driven conveyor starwheels with circumferentially arranged container transport elements, wherein a radian measure distance between subsequent container transport elements defines the conveying pitch of the respective conveyor starwheel, and wherein the radian measure distance in the conveyor starwheel of the conveyor means located further away from the discontinuously working container treatment machine is twice the radian measure distance between the consecutive container transport elements of the conveyor starwheel of the circulating conveyor means located closer to the discontinuously working container treatment machine.

8. Container treatment plant according to claim 7, wherein the container transport elements of the conveyor starwheel comprise controlled or non-controlled container acceptance and/or transfer means.

9. Container treatment plant according to claim 7, wherein at least two of the conveyor starwheels have identical working diameters.

10. Container treatment plant according to claim 1, wherein at least one of the at least two continuously driven circulating conveyor means (F1, F1') provided in the feed conveyor (Z) and/or in the discharge conveyor (A) and located further away from the discontinuously working container treatment machine (MT) comprises either a discharge or feed device of a continuously working container treatment machine (MK1, MK2), or comprises a continuously working container treatment machine (MK1, MK2) which is connected in a block via the feed conveyor (Z) or the discharge conveyor (A) with the discontinuously working container treatment machine (MT).

11. Container treatment plant according to claim 10, wherein the continuously working container treatment machine (MK1, MK2) is one of a rotary stretch-blow molding machine, a closer, or a labeling machine.

12. Container treatment plant according to claim 1, wherein the discontinuously working container treatment machine (MT) comprises a filler or a sterilizer.

* * * * *